Oct. 17, 1939.  N. A. PALMGREN  2,176,435

RADIAL PLAIN BEARING FOR GREASE LUBRICATION

Filed Feb. 27, 1936

INVENTOR
Nils Arvid Palmgren
BY
his ATTORNEY

Patented Oct. 17, 1939

2,176,435

UNITED STATES PATENT OFFICE 2,176,435

RADIAL PLAIN BEARING FOR GREASE LUBRICATION

Nils Arvid Palmgren, Goteborg, Sweden, assignor to Aktiebolaget Svenska Kullagerfabriken, Goteborg, Sweden, a corporation of Sweden Application February 27, 1936, Serial No. 66,008
In Sweden April 6, 1935

11 Claims.  (Cl. 308—122)

The purpose of the present invention is to provide reliable grease lubricating means in a bearing designed for taking thrust or for carrying combined radial and thrust loads. For this purpose the bearing is provided with thrust taking surfaces. The parts of the bearing are further formed so as to enclose a cavity for containing grease or other semisolid lubricant, the cavity being located nearer to the center of the bearing than is the sliding surface and communicating with the inner periphery of the sliding surface.

Figure 1:
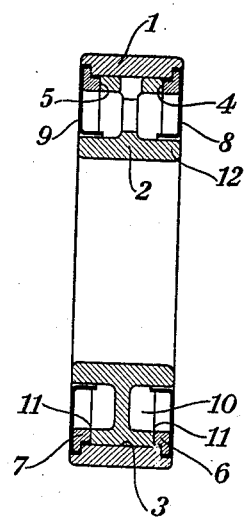
Figure 2:
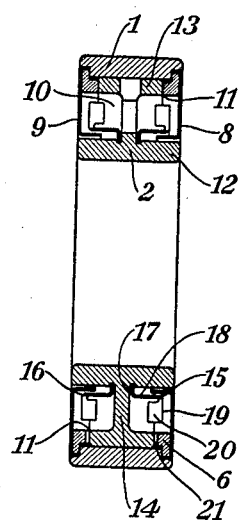
Figure 3:
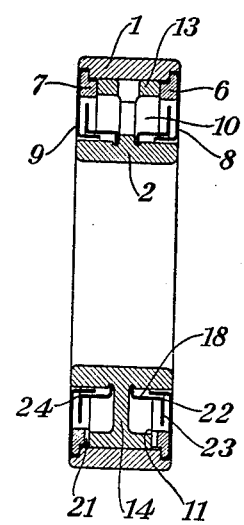
Figure 4:
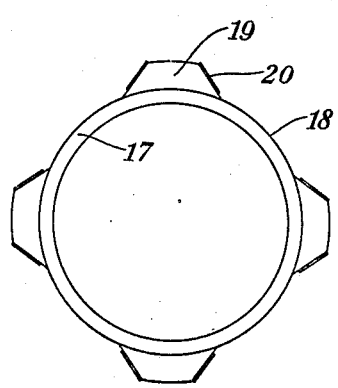
Figure 5:
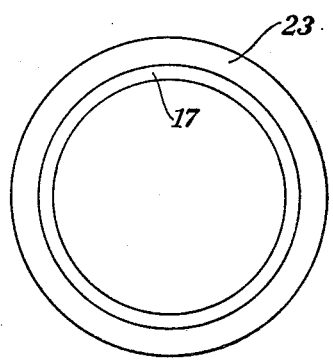

The invention is illustrated on the accompanying drawing in which:

Figure 1 is a section in an axial plane through a bearing according to one form of the invention, Figures 2 and 3 are corresponding sections through two other forms of the bearing, Figure 4 is a side view of a grease thrower for a bearing according to Figure 2, and Figure 5 is a side view of a grease thrower for a bearing according to Figure 3.

The bearing illustrated in Figure 1 comprises an outer ring 1 provided internally with a cylindrical sliding surface for carrying radial loads. The inner ring 2 has an external cylindrical sliding surface 3 for carrying radial loads and two plane sliding surfaces 4, 5 for taking thrust. The surfaces 4 and 5 each bear against the thrust rings 6 and 7 respectively, which thrust rings are axially supported by guard plates 8 and 9 respectively, fixed to the outer ring 1. The inner ring 2, the guard plates 8 and 9 and the thrust rings 6 and 7 enclose a cavity 10 into which grease may be introduced. This cavity 10 is located nearer to the center of rotation of the bearing than are the surfaces 4, 5. When the inner ring 2 rotates, part of the grease in the cavity also rotates and is thrown outwardly by the centrifugal force and is pressed into what might be termed a lubricant film space between the thrust surfaces of the inner ring and of the thrust rings at the inner periphery 11 of these surfaces. The inner periphery of the lubricant film space between the thrust surfaces is illustrated as being directly in communication with the cavity 10. The guard plates 8, 9 fit tightly into the outer ring 1 and have no openings whatever, with the exception of a narrow opening at the inner flange 12 of the inner ring 2. This opening is, however, located nearer to the center of rotation than is the cavity 10 and there is, therefore, no tendency of the centrifugal force pressing the lubricant out through this opening. If the grease lubrication is to be effective during any length of time, it is of prime importance that the cavity be entirely enclosed in this manner. If there were, for instance, openings in the side walls of the guard plates 8, 9, the pressure set up by the centrifugal force in the grease charge would press the grease out through these openings and lubrication would soon cease.

The bearing according to Figure 2 is of substantially the same design as the bearing according to Figure 1. The inner ring comprises an inner flange 12, an outer flange 13 and a web 14 connecting both flanges. Two grease throwers 15, 16, are fixed to the inner flange 12 of the inner ring in grooves provided adjacent to the web 14. The grease thrower 15 consists of an annular disc having a flat portion 17 located adjacent to the web 14, a cylindrical part 18 having an inner diameter greater than the outer diameter of the flange 12, and a number of parts 19 extending radially outwardly from the outer edge of the cylindrical portion 18.

These radially extending parts 19 are bent to form sloping axially extending planes 20 for causing the grease to partake in the rotation of the inner ring and aid in effectively throwing the grease outwardly toward the inner periphery 11 of the lubricant film space of the thrust bearing. A lubricant channel 21 is provided on the thrust ring 6 to facilitate the entrance of the grease between the thrust taking surfaces. The design of the grease thrower 15 is further illustrated in Figure 4.

A further description of the manner in which parts 20 of the grease throwers 15 and 16 are formed may to advantage be expressed in somewhat other words. The grease throwers are formed with radially extending parts 19 having at each side in the peripheral direction a flap or wing member 20. These wing members are bent along lines converging away from the center of the grease throwers to form an angle of about 90° with the radially extending parts 19. In Figure 2 of the drawings the wing members are shown as bent inwardly toward the central plane of the bearing. Since the wing members are bent along lines which do not coincide with the radii of the grease throwers, the wing members will not be located in planes which pass through the axis of the bearing but in planes which are more or less parallel to the axis of the bearing, depending upon whether the angle between the wing members 20 and the radially extending part 19 is a 90° angle or not.

The bearing according to Figure 3 is designed in substantially the same manner as the bearing according to Figure 2, but the grease thrower 22 is annular, there being a plane flange 23 extending radially outwards from the cylindrical part of the grease thrower at a distance from the web to the vicinity of the inner periphery 11 of the thrust surface. Since in this form of the invention the grease in the cavity 10 is almost entirely enclosed by the inner ring 2 and the rotating grease throwers 22, 24 connected thereto, the grease will partake in the rotation and will thereby be pressed into the lubricant channels 21 and from there into the space between the thrust surfaces. Between the radially extending flange 23 of the thrower 22 and the flange 13 of the inner ring 2 there is formed an annular opening extending entirely around the outer periphery of the cavity so that the cavity will directly communicate with the inner periphery 11 of the lubricant film space in all relative positions of rotation of the bearing rings 1 and 2 and especially with the lubricant channel 21. The annular form of the grease thrower is illustrated in Figure 5.

The invention is applicable to many other forms of bearings than those illustrated, an instance being plain bearings which are capable of taking thrust only may be designed according to the invention.

Having thus described my invention, I claim and desire to secure by Letters Patent:

1. A plain bearing for grease lubrication having sliding surfaces for taking thrust, parts of the bearing substantially enclosing a cavity for grease located substantially nearer to the center of rotation of the bearing than are the sliding surfaces and communicating with the inner periphery of the sliding surfaces, and grease throwers located radially inwardly of the thrust taking surfaces and connected to the rotatable bearing part for forcing the grease to partake in the rotation of the bearing.

2. A plain bearing for grease lubrication having sliding surfaces for taking thrust, parts of the bearing substantially enclosing a cavity for grease located substantially nearer to the center of rotation of the bearing than are the sliding surfaces and communicating with the inner periphery of the sliding surfaces, the cavity being located within the rotatable part of the bearing and provided with an annular opening at or adjacent to the inner periphery of the thrust taking surfaces and grease throwers located radially inwardly of the thrust taking surfaces and connected to the rotatable bearing part for forcing the grease to partake in the rotation of the bearing.

3. A plain bearing for grease lubrication having sliding surfaces for taking thrust, parts of the bearing substantially enclosing a cavity for grease located substantially nearer to the center of rotation of the bearing than are the sliding surfaces and communicating with the inner periphery of the sliding surfaces, and grease throwers connected to the rotatable bearing part for forcing the grease to partake in the rotation of the bearing, the grease throwers being provided with surfaces located in a plane spaced from but substantially parallel to the axis of the bearing for effectively throwing the grease.

4. A plain bearing for grease lubrication having sliding surfaces for taking thrust, parts of the bearing substantially enclosing a cavity for grease located substantially nearer to the center of rotation of the bearing than are the sliding surfaces and communicating with the inner periphery of the sliding surfaces, the cavity being located within the rotatable part of the bearing and provided with an annular opening at or adjacent to the inner periphery of the thrust taking surfaces and grease throwers connected to the rotatable bearing part for forcing the grease to partake in the rotation of the bearing, the grease thrower being provided with surfaces located in a plane spaced from but substantially parallel to the axis of the bearing for effectively throwing the grease.

5. A plain bearing for grease lubrication having a sliding surface for taking thrust, parts of the bearing substantially enclosing a cavity for grease located substantially nearer to the center of rotation of the bearing than is the thrust taking sliding surface and communicating with the inner periphery of the thrust taking sliding surface, the inner bearing ring comprising an inner flange for mounting on a shaft, an outer flange with sliding surfaces and a web connecting the flanges, and a grease thrower mounted on the said inner flange and extending radially outwardly from the inner flange at a distance axially from the web to the vicinity of the inner side edge of the outer flange.

6. A plain bearing for grease lubrication having a sliding surface for taking thrust, parts of the bearing substantially enclosing a cavity for grease located substantially nearer to the center of rotation of the bearing than is the thrust taking sliding surface and communicating with the inner periphery of the thrust taking sliding surface, and grease throwers mounted on the rotatable bearing part for forcing the grease to partake in the rotation of the bearing, the inner bearing ring comprising an inner flange for mounting on a shaft, an outer flange with sliding surfaces and a web connecting the flanges, the grease throwers extending radially outwardly from the inner flange at a distance axially from the web to the vicinity of the inner side edge of the outer flange.

7. A plain bearing for grease lubrication having a sliding surface for taking thrust, parts of the bearing substantially enclosing a cavity for grease located substantially nearer to the center of rotation of the bearing than is the thrust taking sliding surface and communicating with the inner periphery of the thrust taking sliding surface, the cavity being located within the rotatable part of the bearing and provided with an annular opening at or adjacent to the inner periphery of the thrust taking surfaces and grease throwers mounted on the rotatable bearing part for forcing the grease to partake in the rotation of the bearing, the inner bearing ring comprising an inner flange for mounting on a shaft, an outer flange with sliding surfaces and a web connecting the flanges, the grease throwers extending radially outwardly from the inner flange at a distance axially from the web to the vicinity of the inner side edge of the outer flange.

8. A plain bearing for grease lubrication having a sliding surface for taking thrust, parts of the bearing substantially enclosing a cavity for grease located substantially nearer to the center of rotation of the bearing than is the sliding surface and communicating with the inner periphery of the sliding surface, the inner bearing ring comprising an inner flange for mounting on a shaft, an outer flange with sliding surfaces and a web connecting the flanges the grease throwers extending radially outwardly from the inner flange at a distance axially from the web to the vicinity of the inner side edge of the outer flange, each of the grease throwers comprising a plain portion fixed to the inner flange of the inner bearing ring at the vicinity of the web, a cylindrical portion having greater inner diameter than is the outer diameter of the inner flange of the inner bearing ring and a portion extending substantially radially outwardly from that portion of the cylindrical part farthest from the web of the inner ring.

9. A plain bearing for grease lubrication having a sliding surface for taking thrust, the bearing substantially enclosing a cavity for grease located substantially nearer to the center of rotation of the bearing than is the sliding surface and communicating with the inner periphery of the sliding surface, and grease throwers connected to the rotatable bearing part for forcing the grease to partake in the rotation of the bearing, the inner bearing ring comprising an inner flange for mounting on a shaft, an outer flange with sliding surfaces and a web connecting the flanges, the grease throwers extending radially outwardly from the inner flange at a distance axially from the web to the vicinity of the inner side edge of the outer flange, each of the grease throwers comprising a plain portion fixed to the inner flange of the inner bearing ring at the vicinity of the web, a cylindrical portion having greater inner diameter than is the outer diameter of the inner flange of the inner bearing ring and a portion extending substantially radially outwardly from that portion of the cylindrical part farthest from the web of the inner ring.

10. A plain bearing for grease lubrication having a sliding surface for taking thrust, parts of the bearing substantially enclosing a cavity for grease located substantially nearer to the center of rotation of the bearing than is the sliding surface and communicating with the inner periphery of the sliding surface, the cavity being located within the rotatable part of the bearing and provided with an annular opening at or adjacent to the inner periphery of the thrust taking surfaces and grease throwers connected to the rotatable bearing part for forcing the grease to partake in the rotation of the bearing, the inner bearing ring comprising an inner flange for mounting on a shaft, an outer flange with sliding surfaces and a web connecting the flanges, the grease throwers extending radially outwardly from the inner flange at a distance axially from the web to the vicinity of the inner side edge of the outer flange, each of the grease throwers comprising a plain portion fixed to the inner flange of the inner bearing ring at the vicinity of the web, a cylindrical portion having greater inner diameter than is the outer diameter of the inner flange of the inner bearing ring and a portion extending substantially radially outwardly from that portion of the cylindrical part farthest from the web of the inner ring.

11. A plain bearing for grease lubrication having an outer bearing ring with an inner cylindrical bearing surface and an inner bearing ring with an outer cylindrical bearing surface rotatable in the said inner bearing surface, the said inner bearing ring having sliding surfaces for taking thrust, thrust rings engaging the said sliding surfaces and supported by guard plates sealingly fixed to the outer ring and extending radially inwardly adjacent to portions of the inner ring which lie on a substantially smaller diameter than the sliding surfaces, whereby the inner and outer rings and the guard plates together form a closed grease chamber, parts of the bearing forming a rotatable cavity for grease located substantially nearer to the center of rotation of the bearing than is the thrust taking sliding surface and communicating directly radially outwardly with the lubricant film spaces between the thrust surfaces of the inner ring and the thrust surfaces of the thrust rings.

NILS ARVID PALMGREN.